(No Model.)

J. F. PETRI.
COUPLING FOR TELEGRAPH OR OTHER WIRES.

No. 250,572.  Patented Dec. 6, 1881.

WITNESSES:
C. Neveux
C. Sedgwick

INVENTOR:
J. F. Petri
BY Munn & Co
ATTORNEYS.

UNITED STATES PATENT OFFICE.

JOHN F. PETRI, OF MIDLAND PARK, NEW JERSEY.

COUPLING FOR TELEGRAPH OR OTHER WIRES.

SPECIFICATION forming part of Letters Patent No. 250,572, dated December 6, 1881.

Application filed May 11, 1881. (No model.)

*To all whom it may concern:*

Be it known that I, JOHN F. PETRI, of Midland Park, Bergen county, New Jersey, have invented a new and Improved Coupling for Telegraph and other Wires, of which the following is a specification.

The object of this invention is to provide a coupling by means of which wires can be joined more expeditiously and with less labor and expenditure of force than by the usual method of twisting them about each other.

The invention consists in coupling the wires by means of a semi-cylindrical metallic plate having two radial holes to receive the bent ends of the wires. The wires, having their ends bent at right angles, are laid in the plate with their ends entered into the holes therein, and the said plate is then, by means of a hand-vise or other suitable tool, clasped tightly about the wires, so as to form a closed sleeve about the point of union.

Figure 1:
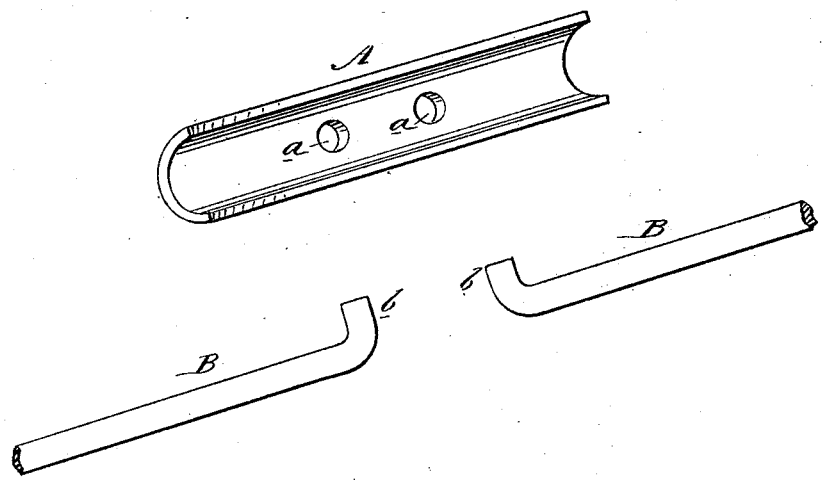
Figure 2:
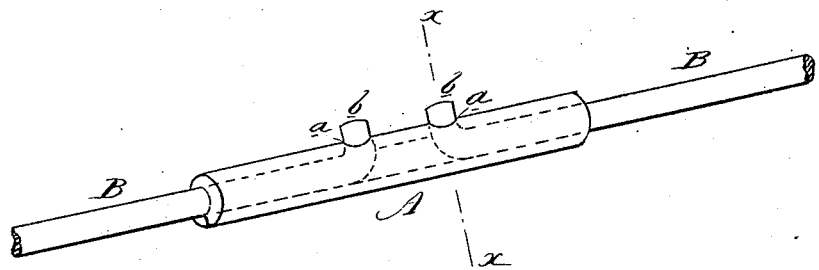

Figure 1 is a perspective view of the coupling and prepared wire ends detached from each other. Fig. 2 is a perspective view of the improved coupling in position in and about the wires; and Fig. 3 is a sectional enlarged end elevation of the same on line x x, Fig. 2.

Similar letters of reference indicate corresponding parts.

In the drawings, A represents the semi-cylindrical metallic plate, provided with two holes, *a a*, a little distance from each other on a line drawn longitudinally and centrally through the said plate A, these holes *a a* being of sufficient diameter for the easy entrance of the extremities of the wires B B, that are bent at right angles, as shown at *b b*. This bending of the wire ends can be readily performed with ordinary pinchers or hand-vise.

Figure 3:
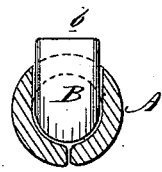

The coupling is done by entering the bent ends *b b* of the wires B B into the holes *a a* of the plate or coupling A, and in then clasping the said plate or coupler A about the wires B B, so as to bend the plate and inclose the wires, as shown in Figs. 2 and 3, it being designed in all cases that this coupling or plate A shall be of sufficient width to completely clasp around said wires B B. This plate or coupling A is preferably stamped from sheet metal, is strong, durable, and most easy of application, and will hold the wires as securely as any other method of coupling.

Having thus described my invention, I claim as new and desire to secure by Letters Patent—

The combination, with telegraph-wires having the bent ends *b*, of a metal plate receiving said bent ends in aligned holes *a a* and clasping the part of wire adjacent to the bends, as shown and described.

JOHN F. PETRI.

Witnesses:
   I. I. STORER,
   C. SEDGWICK.